(12) United States Patent
Kawai et al.

(10) Patent No.: US 8,728,668 B2
(45) Date of Patent: May 20, 2014

(54) NEGATIVE ELECTRODE ACTIVE MATERIAL FOR LITHIUM ION RECHARGEABLE BATTERY AND NEGATIVE ELECTRODE USING THE SAME

(75) Inventors: Takanobu Kawai, Shiga (JP); Kenichi Hongawa, Shiga (JP); Hayato Matsumoto, Shiga (JP)

(73) Assignee: Nippon Carbon Co., Ltd., Tokyo (JP)

( * ) Notice: Subject to any disclaimer, the term of this patent is extended or adjusted under 35 U.S.C. 154(b) by 1450 days.

(21) Appl. No.: 12/227,945

(22) PCT Filed: May 25, 2007

(86) PCT No.: PCT/JP2007/000559
§ 371 (c)(1),
(2), (4) Date: Jun. 17, 2010

(87) PCT Pub. No.: WO2007/141905
PCT Pub. Date: Dec. 13, 2007

(65) Prior Publication Data
US 2010/0297500 A1    Nov. 25, 2010

(30) Foreign Application Priority Data
Jun. 2, 2006    (JP) .................................. 2006-155454

(51) Int. Cl.
H01M 4/13    (2010.01)
H01M 4/58    (2010.01)

(52) U.S. Cl.
USPC ....................................................... 429/231.8

(58) Field of Classification Search
USPC ....................................................... 429/238.1
See application file for complete search history.

(56) References Cited

U.S. PATENT DOCUMENTS

2006/0214104 A1 *   9/2006   Pope et al. ..................... 250/297
2007/0128518 A1 *   6/2007   Uono et al. ................ 429/231.4

* cited by examiner

Primary Examiner — Roy King
Assistant Examiner — Jenny Wu
(74) Attorney, Agent, or Firm — Flynn, Thiel, Boutell & Tanis, P.C.

(57) ABSTRACT

A negative electrode active material for a lithium ion rechargeable battery having high electrode density, excellent in permeability of an electrolyte, less in capacity loss due to charging/discharging, and excellent in cycle performance is provided at a low cost. The negative electrode active material is a mixture of three kinds of graphite powders having different hardnesses and shapes from one another, with a binder added thereto and is coated onto a metallic current collector to be dried and pressed, thereby rendering an electrode density not lower than 1.7 g/cm$^3$.

4 Claims, 1 Drawing Sheet

NEGATIVE ELECTRODE ACTIVE MATERIAL FOR LITHIUM ION RECHARGEABLE BATTERY AND NEGATIVE ELECTRODE USING THE SAME

FIELD OF THE INVENTION

The present invention relates to a negative electrode active material for a lithium ion rechargeable battery for use in a notebook computer, a cellular phone, and so forth, and in particular, to a negative electrode high in capacity, less in capacity loss, and excellent in charge and discharge repeatability (cycle characteristics), and a negative electrode active material. Further, the present invention relates to a negative electrode having high power, and high output, such as a carbon negative electrode for use in a medium/large sized lithium ion rechargeable battery for use in an electric bicycle (E-bike), a hybrid electric vehicle (HEV), and so forth, and a negative electrode active material.

BACKGROUND OF THE INVENTION

The lithium ion rechargeable battery has been in widespread use as a small and light-weight rechargeable battery having a high capacity and high voltage and is suitable for use in portable equipment such as a cellular phone, a video camera, and so forth. Further, a lithium ion rechargeable battery having a high-output has lately come into widespread use as a power supply for an electric power tool requiring a large amount of power.

As there has been seen no sign of a slowdown in the trend for portable equipment towards further miniaturization, higher performance and higher function, so miniaturization•lighter weight, and higher capacity are required of the lithium ion rechargeable battery.

While attempts have been made to achieve a higher performance with respect to each of the components of the lithium ion rechargeable battery and material thereof, particular importance is attached to a higher density•higher capacity of a negative electrode material among others, as a determinant of battery performance, so that spheroidizing of a graphite particle has been proposed.

Patent Document 1 JP 2983003B
Patent Document 2 JP 3588354B
Patent Document 3 JP 3716830B
Patent Document 4 JP 3716818B
Patent Document 5 JP 11-73963A

DISCLOSURE OF THE INVENTION

When a discharge capacity per unit weight is examined with respect to a carbon-base negative electrode material, it is known that the discharge capacity has substantially reached a theoretical value thereof, and in order to enhance a battery capacity, it is required that a battery be packed with a lot of negative electrode material, that is, a negative electrode be made up to have an electrode density of not less than 1.7 g/cm$^3$, preferably not less than 1.8 g/cm$^3$. Furthermore, an inexpensive negative electrode excellent in productivity, and capable of maintaining a high capacity, and a negative electrode material enabling such a negative electrode to be produced are required.

Meanwhile, from the viewpoint of environmental problems, there has been developed an electric vehicle, particularly, a hybrid electric vehicle (HEV) using a nickel-hydrogen battery in combination with a gasoline engine, and attention has been focused on a lithium ion battery higher in energy density, and generating a high voltage as a power supply source for use in an HEV of the next generation.

Higher input/output characteristics as compared with those for a small-sized lithium ion battery for use in conventional portable equipment are required of the lithium ion battery for use in the HEV, however, the lithium ion battery for use in the HEV is just at the beginning of development.

In order to manufacture an inexpensive battery, it is necessary to use an inexpensive material capable of maintaining performance, and the same can be said of a negative electrode material.

In order to implement a high-capacity battery, use of flake natural graphite is preferable as it is inexpensive, and gives the security of a supply in a large quantity, however, the flake natural graphite has a charge/discharge efficiency less than 90%, and particles thereof, when applied to a copper foil to serve as an electrode, are extremely oriented in a plane direction, so that the flake natural graphite has a problem in terms of cycle characteristics and low temperature properties as well.

In addition, if the electrode density is increased, this will cause the particles to stick to one another, thereby clogging up a continuous flow path through which an electrolyte is to flow, formed between the particles, and leading to problems such as a deterioration in battery characteristics, and so forth. Therefore, it is practically impossible to use the flake natural graphite as it is.

In order to solve this problem, there have been developed graphite particles produced by reducing flake natural graphite to a spherical shape, and applying a coating treatment to the surface thereof, however, the cost of producing the same is largely dependent on the coating method. For example, in the case of a method of depositing pyrocarbon on the surface of each of the graphite particles by the CVD process, expensive facilities and highly-developed operating techniques are required and, furthermore, since there exists a problem with productivity, it is difficult to supply products at a low cost.

A method of coating the surface with a resin and pitch is carried out by use of, for example, a heating kneader, or mechanical treatment (mechanochemical process). With the use of the heating kneader, production is feasible at a relatively low cost, but the mechanochemical process is inferior in terms of productivity to a method using the heating kneader.

A coating formed on the surface of graphite particles produced by any of those methods is smooth.

Since the graphite particles produced by a conventional method is substantially spherical in shape, and has a smooth surface, if an electrode is made up by use of the graphite particles, and charge/discharge are repeated with the electrode, there will occur a decrease in the number of contact points between the particles of a negative electrode material, due to repetition of expansion/contraction of the negative electrode material, thereby causing an electrically conductive network inside the electrode to collapse, so that a problem is prone to occur to the cycle characteristics.

The present invention provides graphite particles to serve as a negative electrode material for a lithium ion rechargeable battery high in discharge capacity per unit volume, small in capacity loss at the time of initial charge/discharge, and excellent in load characteristics at the time of quick charge/discharge, and so forth, and a negative electrode using the same.

While carbon or graphite is used as a negative electrode material for the lithium ion rechargeable battery, a carbonaceous material is generally hard, and has difficulty in attaining the higher electrode density essential for attaining the higher performance of a battery. On the other hand, a graphite material is soft and easy to attain higher electrode density. Further, there is the need for ensuring the existence of voids in order to promote permeation of a battery electrolyte into an electrode material, however, a requirement for higher electrode density, and a requirement for ensuring the voids represent requirements that contradict each other, so that it has been extremely difficult to obtain a negative electrode material high in performance by meeting both the requirements.

It is therefore an object of the invention is to provide a negative electrode for a lithium ion rechargeable battery having a high electrode density, excellent permeability of an electrolyte, less capacity loss due to charging/discharging, and excellent cycle characteristics, and a negative electrode active material as a constituent of the negative electrode.

SUMMARY OF THE INVENTION

With the present invention, the problems are solved by mixing three kinds of graphite powders having different in hardnesses and shapes from one another and, in accordance with one aspect of the invention, there is provided a negative electrode active material for a lithium ion rechargeable battery, which is a mixture comprising 30 to 60 wt % of the graphite powder A obtained by pulverizing an artificial graphite block composed of cokes, and binder pitch, wherein the relationship between press pressure P(kN), and electrode density D(g/cm$^3$) is expressed as D=0.04 to 0.06 P, 20 to 50 wt %, of the graphite powder B obtained by coating spherical natural graphite with pitch, impregnating the same with the pitch to be subsequently baked, and graphitized, wherein the relationship between press pressure P(kN), and electrode density D(g/cm$^3$) is expressed as D=0.04 to 0.06 P, and 5 to 30 wt % of the graphite powder C obtained by coating spherical natural graphite with pitch, impregnating the same with the pitch to be subsequently baked, wherein the relationship between press pressure P(kN), and electrode density D(g/cm$^3$) is expressed as D=0.01 to 0.03 P.

Further, the present invention provides in another aspect a negative electrode active material for a lithium ion rechargeable battery, which is a mixture of three kinds of graphite powders having a different hardness and shape from one another, comprising 30 to 60 wt % of the graphite powder A obtained by pulverizing and sizing an artificial graphite block composed of coke, and binder pitch, having a tap density in a range of 0.4 to 1.0 (g/cm$^3$), 20 to 50 wt % of the graphite powder B obtained by coating and impregnating spherical natural graphite with pitch to be subsequently baked and graphitized, having a tap density in a range of 0.8 to 1.4 (g/cm$^3$), and 5 to 30 wt % of the graphite powder C obtained by coating and impregnating spherical natural graphite with pitch to be subsequently baked, having a tap density in the range of 0.8 to 1.4 (g/cm$^3$).

By mixing the graphite powders having different characteristics from one another, it has been possible to obtain a negative electrode for a lithium ion rechargeable battery having excellent permeability of an electrolyte, less capacity loss due to charging/discharging, and excellent cycle characteristics, even at a high electrode density of not less than 1.7 g/cm$^3$, and a negative electrode active material as a constituent of the negative electrode.

PREFERRED EMBODIMENT OF THE INVENTION

Figure 1:
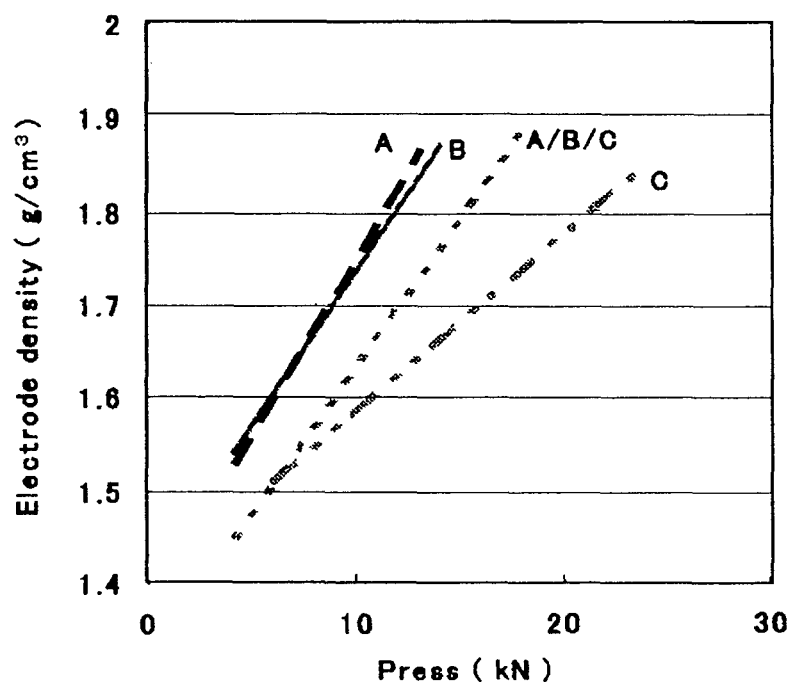
FIG. 1 is a graph showing the relationship between the press pressure of an electrode and electrode density.

A negative electrode active material according to the invention is obtained by mixing three kinds of graphite powders shown hereunder with one another at a predetermined ratio.
1: Graphite Powder A: graphite powders obtained by pulverizing an artificial graphite block composed of cokes, and binder pitch, wherein the relationship between press pressure P (kN), and electrode density D(g/cm$^3$) is expressed as D=0.04 to 0.06 P, or tap density is in a range of 0.4 to 1.0 (g/cm$^3$), the graphite powder being artificial graphite powders obtained by pulverizing an artificial graphite block composed of a known filler/binder-based material. The graphite powder A can be produced by, for example, methods as disclosed in JP2983003, and JP3588354, respectively.

Otherwise, the graphite powder A can be obtained by pulverizing, for example, an isotropic artificial graphite block, a molded artificial graphite block, and an extruded artificial graphite block, produced by *Nippon Techno-Carbon* (New Japan Techno-Carbon Co. Ltd).

Sizing with the use of an air separator, a vibrating sieve, an ultrasonic screen and so forth, as necessary, surface modification by a mechanochemical treatment, shape control, or re-baking, treatment by re-graphitization, and so forth are applied to those graphite powders. The graphite powders are highly crystallized because they are highly graphitized, so that an electrode having an electrode density of 1.6 g/cm$^3$ and thickness of 80 μm is formed over a copper foil by use of 2 parts by weight of SBR and CMC, respectively, against 100 parts by weight of the those powders, with Li metal used as a counter electrode so as to oppose the electrode with a separator interposed therebetween, whereupon a coin cell is formed by adding an electrolyte of IM LiP6/EC:MEC (1:1) thereto, and a charge/discharge test is conducted on the coin cell, in which a case discharge capacity of 340 to 360 mAh/g and efficiency of 90 to 94% are exhibited at 0.2 C.

Because the graphite powder is highly graphitized, the graphite powder is very soft, and if the graphite powder is molded by increasing the press pressure, an electrode density at a high value is indicated. However, if the electrode density exceeds 1.7 g/cm$^3$, this will cause a collapse of voids into which an electrolyte is to enter, thereby lowering permeation rate of the electrolyte, so that portions making no contribution in charging and discharging will occur inside the electrode, in which case, the electrode does not effectively function, and cannot be put to use. Accordingly, it is effectively impossible to use the graphite powder A alone for obtaining a high electrode density in excess of 1.7 g/cm$^3$.

2. Graphite Powder B: graphite powders obtained by coating spherical natural graphite with pitch, impregnating the same with the pitch to be subsequently baked, and graphitized, wherein the relationship between press pressure P(kN), and electrode density D(g/cm$^3$) is expressed as D=0.04 to 0.06 P, or the tap density is in a range of 0.8 to 1.4 (g/cm$^3$), the graphite powder being graphite powders obtained by mechanically reducing flake natural graphite to a substantially spherical shape to be impregnated and coated with coal pitch or petroleum pitch, followed by baking at a temperature in a range of 700 to 1300° C. before graphitization at a temperature not lower than 2800° C. The graphite powder B can be produced by, for example, a method as set forth in JP 3716830W. By use of 5 parts by weight of PVdF against 100 parts by weight of that powder, an electrode having an electrode density of 1.6 g/cm³ and a thickness of 80 μm is formed over a copper foil, further, with Li metal used as a counter electrode so as to oppose the electrode with a separator interposed therebetween, whereupon a coin cell is formed by adding an electrolyte of 1M LiP6/EC:MEC (1:1) thereto, and a charge/discharge test is conducted on the coin cell, in which case a discharge capacity of 362 mAh/g, and efficiency of 94% are exhibited at 0.2 C.

Since the particle size distribution, that is, a D90/D10 ratio is as narrow as on the order of 2.70±0.15, voids into which the electrolyte is to enter is sufficiently secured at a low electrode density (up to on the order of 1.6 g/cm³). However, since the particles of the graphite powder as a whole are soft, if the electrode density is rendered higher by increasing the molding press pressure, this will cause the particles to undergo deformation, so that the electrode density is prone to rise. The particles are mainly in point contact with one another at a low electrode density, however, it is presumed that as the particles come to be pressed into contact with one another, the particles will undergo further deformation, thereby forming an electrically conductive network in such a form as to include a state of line contact and face contact, in addition to the point contact.

When the molding press pressure is further raised and the electrode density comes to exceed 1.7 g/cm³, the graphite powders undergo a larger deformation, thereby crushing the voids into which the electrolyte is to enter so that the permeation rate of the electrolyte becomes lower, and portions making no contribution in charging and discharging will occur inside the electrode, in which case the electrode does not effectively function, and cannot be put to practical use. That is, it is impossible to produce an electrode having an electrode density in excess of 1.7 g/cm³ by use of the graphite powder B alone.

3. Graphite Powder C: graphite powder obtained by coating spherical natural graphite with pitch, impregnating the same with the pitch to be subsequently baked, wherein the relationship between the press pressure P(kN) and electrode density D(g/cm³) is expressed as D=0.01 to 0.03 P, or tap density is in a range of 0.8 to 1.4 (g/cm³), the graphite powder being graphite powder obtained by mechanically reducing flake natural graphite to a substantially spherical shape to be impregnated and coated with coal pitch or petroleum pitch, to be followed by baking at a temperature in a range of 900 to 1300° C. More specifically, the graphite powder C can be produced by, for example, a method as set forth in JP 3716818. Since the carbon portions originating from the pitch are carbonaceous and hard, the carbon portions are insusceptible to collapsing as compared with graphite particles, so that the rise in the electrode density is slow, even when pressure is applied to the powder for pressing. Because the particles remain spherical in shape without undergoing deformation in shape and particle size distribution, that is, the D90/D10 ratio is as narrow as on the order of 2.70±0.15, voids between the particles are sufficiently secured, so that an electrolyte can be impregnated in short time.

By use of 5 parts by weight of PVdF (#9305 manufactured by Kureha) against 100 parts by weight of the powder, an electrode having an electrode density of 1.6 g/cm³ and thickness of 80 μm was formed over a copper foil, with Li metal used as a counter electrode so as to oppose the electrode, with a separator interposed therebetween, whereupon a coin cell was formed by adding an electrolyte of 1M LiPF6/EC:MEC (1:1) thereto, and a charge/discharge test was conducted on the coin cell, in which case the discharge capacity of 352 mAh/g and efficiency of 92% were exhibited at 0.2 C. However, the graphite powder C is excellent in permeation time but high in hardness, so that it is difficult to have the powder pressed to attain an electrode density over 1.7 g/cm³. Furthermore, since the graphite powder C is spherical in shape, particles contact each other at a point within the electrode, so that the graphite powder C becomes low in electrical conductivity, resulting in a deterioration in cycle and electrode characteristics.

In the case of forming an electrode out of the graphite powder C alone, contact between the particles becomes mainly point contact, so that the number of the point contacts between the particles gradually decreases after cyclic expansion and contraction of the respective particles accompanying storage・release of Li ions, thereby causing the graphite powder C to be prone to induce poor contact, and results in an increase in impedance. Accordingly, there will be a strong possibility of the graphite powder C inducing a deterioration in the cycle characteristics of a battery.

Meanwhile, a negative electrode material based on mesophase pitch, obtained by pulverizing, sizing, baking, and graphitizing meso-carbon micro beads, and bulk meso-phase pitch, is well known as particles exhibiting a behavior similar to that of the particles of the graphite powder C. If those particles are sufficiently refined in a raw material stage so as to be highly graphitized, the particles can attain a discharge capacity of 345 mAh/g and efficiency on the order of 94%, as is the case with the graphite powder C. However, since those particles are relatively hard, it is difficult to prepare the same to have an electrode density in excess of 1.7 g/cm³ for the same reason as in the case of the graphite powder C. Furthermore, prices on them are high, so that it is difficult to cope with the requirements for supply of inexpensive material.

Example 1

By mixing three kinds of graphite powders (negative electrode active material) A, B, and C, described hereunder, having different hardnesses and shapes from one another, at a mixing ratio of A:B:C=50:30:20, a mixture was prepared, and a water-based slurry was prepared by adding 2 parts by weight of SBR and CMC, respectively, to 100 parts by weight of the mixture, whereupon the water-based slurry was applied to a copper foil by use of a doctor blade, and dried at 120° C. to be then punched to a shape of ϕ12, thereby forming an electrode by pressing with the use of a tablet-forming machine;

A: graphite powders having an outermost shell surface lower in crystallinity than the interior thereof, obtained by pulverizing, and sizing an artificial graphite block composed of cokes, and binder pitch, and applying physical surface treatment thereto. The tap density thereof was 0.6 g/cm³ while D50=17 μm, and the D90/D10=6.

B: graphite powders produced by coating and impregnating spherical natural graphite obtained by substantial spheroidizing of vein and flake natural graphite with pitch to be subsequently baked and graphitized. The tap density thereof was 1.2 g/cm³, while D50=13 μm and the D90/D10=3.

C: graphite powders produced by coating and impregnating spherical natural graphite obtained by substantial spheroidizing of vein and flake natural graphite with pitch to be subsequently baked. The tap density thereof was 1.2 g/cm³ while D50=13 μm, and the D90/D10=3.

In FIG. 1, there is shown the relationship between press pressure of an electrode and electrode density (press pressure shown along the horizontal axis and electrode density shown along the vertical axis as a plot). According to FIG. 1, the press pressure (P) is proportional to the electrode density (D), and the respective slopes of the lines indicate the relationship in the respective cases are A=0.05, B=0.04, and C=0.02, while, in Example 1, (the mixture of A:B:C=50:30:20)=0.03.

An electrolyte of 1M LiPF6/EC:MEC (1:1), 2 μl in volume, was dripped onto those graphite powders, thereby taking measurements on time(s) up to complete permeation therein. The results of the measurements are shown in FIG. 2 and Table 1.

Figure 2:
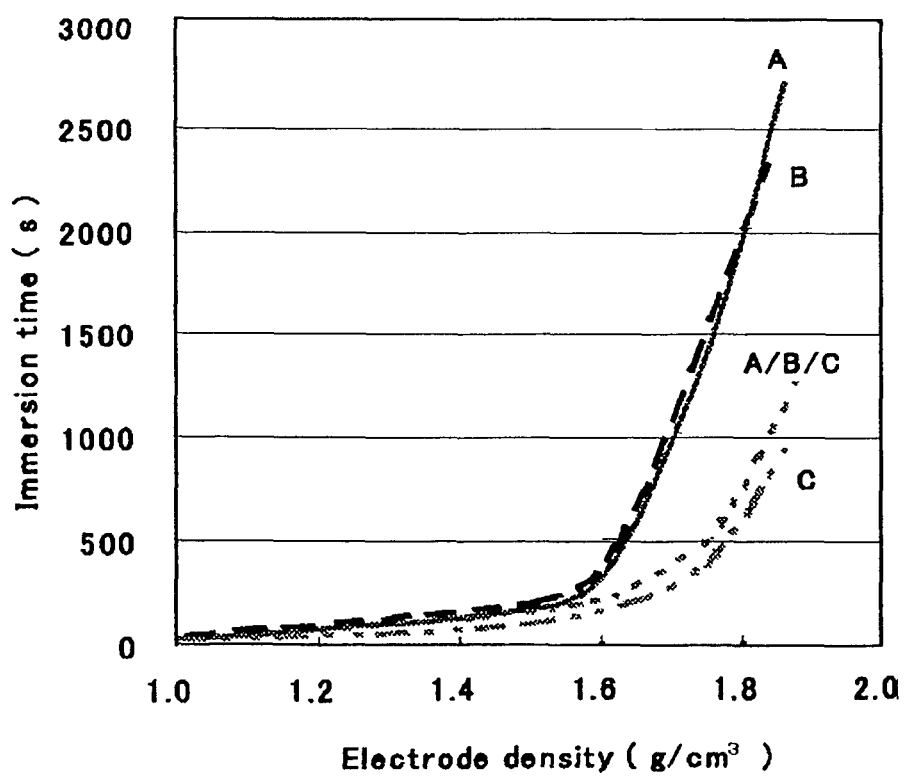
FIG. 2 is a graph showing the relationship between the electrode density and time up to the complete permeation of an electrolyte.

As is evident from Table 1 and FIG. 2, with respect to the graphite powder A, and B, respectively, a permeation rate of the electrolyte was found to be extremely low when the electrode density exceeded 1.6 g/cm$^3$, indicating that continuous voids sufficient to allow the electrolyte to permeate into an electrode were not provided throughout the electrode. With respect to the graphite powder C, the permeation time(s) was excellent, however, the graphite powders were high in hardness so it was difficult to have the graphite powder compacted to attain an electrode density in excess of 1.7 g/cm$^3$. Furthermore, since the powders were spherical in shape, the powders were in point contact with one another within the electrode, so that the graphite powder C was low in electrical conductivity, resulting in a deterioration in electrode characteristics such as cycle characteristics, and so forth.

On the other hand, with the working example 1 (the mixture of A/B/C), voids were held while remaining crushable with ease, so that an enhancement in the permeation rate of the electrolyte was attained, indicating that continuous voids sufficient to allow the electrolyte to permeate into the electrode were provided throughout the electrode, even at an electrode density exceeding 1.7 g/cm$^3$.

TABLE 1

| | graphite powders | permeation time(s) electrode density(g/cm$^3$) 1.7 | electrode density(g/cm$^3$) 1.8 |
|---|---|---|---|
| example 1 | A/B/C = 50/30/20 | 375 | 667 |
| example 2 | A/B/C = 50/40/10 | 452 | 781 |
| example 3 | A/B/C = 30/40/30 | 303 | 621 |
| comparative example 1 | A | 1024 | 1833 |
| comparative example 2 | B | 929 | 1833 |
| comparative example 3 | C | 238 | 571 |
| comparative example 4 | A/C = 1/1 | 596 | 1069 |
| comparative example 5 | B/C = 1/1 | 583 | 1079 |
| comparative example 6 | B/C = 2/1 | 631 | 1191 |

Example 2

By mixing the three kinds of graphite powders (the negative electrode active material) A, B and C, having different hardnesses and shapes from one another, at a mixing ratio of A:B:C=50:40:10 (by weight), a mixture was prepared, and a water-based slurry was prepared by adding 2 parts by weight of SBR, and CMC, respectively, to 100 parts by weight of the mixture, as is the case with Working Example 1, whereupon the water-based slurry was applied to a copper foil by use of the doctor blade, and dried at 120° C. to then be punched to a shape of ϕ12, thereby forming an electrode by pressing with the use of the tablet-forming machine. An electrolyte of 1M LiPF6/EC:MEC (1:1), 2 μl in volume, was dripped onto the electrode, then measurements were taken of the time(s) up to complete permeation therein. The results of the measurements are shown in Table 1.

Example 3

By mixing the three kinds of the graphite powders (the negative electrode active material) A, B, and C, having different hardnesses and shapes from one another, at a mixing ratio of A:B:C=30:40:30 (by weight), a mixture was prepared, and a water-based slurry was prepared by adding 2 parts by weight of SBR, and CMC, respectively, to 100 parts by weight of the mixture, as is the case with Working Example 1, whereupon the water-based slurry was applied to a copper foil by use of the doctor blade, and dried at 120° C. to then be punched to a shape of ϕ12, thereby forming an electrode by pressing with the use of the tablet-forming machine. An electrolyte of 1M LiPF6/EC:MEC (1:1), 2 μl in volume, was dripped onto the electrode, then measurements were taken of the time(s) up to complete permeation therein. The results of the measurements are shown in Table 1.

Comparative Examples

By mixing the graphite powder A, B, and C at a mixing ratio (by weight) of A:B:C, as shown in Table 1, as with Example 1, a mixture was prepared, and a water-based slurry was prepared by adding 2 parts by weight of SBR and CMC, respectively, to 100 parts by weight of the mixture, whereupon the water-based slurry was applied to a copper foil by use of the doctor blade, and dried at 120° C. to then be punched to a shape of ϕ12, thereby forming an electrode by pressing with the use of the tablet-forming machine. An electrolyte of 1M LiPF6/EC:MEC (1:1), 2 μl in volume, was dripped onto the electrode and measurements were taken on the time(s) up to complete permeation therein. The results of the measurements are shown in Table 1. As for a mixing ratio of the graphite powder C, the graphite powder C being high in hardness, it was difficult to have the powder compacted to attain an electrode density in excess of 1.7 g/cm$^3$, so that the mixing ratio thereof was set to 50% of the mixture in whole at the maximum.

With the Comparative Examples 1, 2, 4, 5 and 6, respectively, the permeation rate of the electrolyte was extremely low as compared with the working examples. In the case of Comparative Example 3, wherein the graphite powder C was solely used, the permeation rate was excellent but, since the powders were hard, the powder particles were insusceptible to collapsing and a rise in the electrode density was slow, even when pressure was applied thereto to press. In addition, when a charge/discharge test was conducted, since the contact between particles was a point contact, the number of the point contacts between the particles gradually decreased after repeated expansion and contraction of the respective particles accompanying storage•release of Li ions, thereby inducing a poor contact, and resulting in an increase in impedance. As a result, a deterioration in cycle characteristics was induced as indicated by a cycle characteristics test described later.

Cycle Test

A coin cell was formed by adding an electrolyte of 1M LiP6/EC:MEC (1:1) to a negative electrode formed of an active material according to Working Example 1, with Li metal used as a counter electrode to oppose the electrode, with a separator interposed therebetween, and the coin cell was subjected to a cycle characteristics test. The test was conducted on the charge/discharge conditions that a constant-current charge was first carried out at a current value of 0.5 C to be switched to a constant-voltage charge upon a voltage value reaching 0.01V, continuing the charge until the current value came down to 0.01 C. After completion of the constant-current charge, constant-current discharge was carried out at the current value 0.5 C, completing the discharge upon the voltage value reaching 1.5V Results of measurements on the cycle characteristics at the electrode density of 1.7 g/cm³ are shown. An initial discharge capacity was designated 100%, and post-cycle discharge capacity/initial discharge capacity× 100 was designated as a post-cycle discharge capacity retention. Relationship between charge/discharge cycles and a discharge capacity retention is shown in Table 2.

In the case of using the graphite powder C alone, an abrupt deterioration in the capacity retention was observed such that the capacity retention was found at 94% after 10 cycles and at 66% after 20 cycles. On the other hand, in the case of Working Example 1 (the mixture of A/B/C), excellent results were observed such that the capacity retention was found at 100% after 10 cycles and at 90% after 20 cycles.

TABLE 2

| Cycle (numbers) | Capacity retention (%) | |
| --- | --- | --- |
| Cycle (numbers) | Working Example 1 | Comparative Example 3 |
| 1 | 100 | 100 |
| 10 | 100 | 94 |
| 20 | 90 | 66 |

Charge/Discharge Test

A coin cell was formed by adding an electrolyte of 1M LiP6/EC:MEC (1:1) to a negative electrode formed of a negative electrode active material according to Working Example 1, with Li metal used as a counter electrode to oppose the electrode, with a separator interposed therebetween, and the coin cell was subjected to a charge/discharge test. The test was conducted at the charge/discharge conditions that the constant-current charge was first carried out at a current value 0.5 mA/cm² to be switched to the constant-voltage charge upon a voltage value reaching 0.01V, continuing the charge until the current value came down to 0.01 mA. After completion of the charge, a constant-current discharge was carried out at the current value of 0.5 mA/cm², completing the discharge upon the voltage value reaching 1.5V. Results of the measurements with respective electrode densities at 1.6, 1.7, and 1.8 g/cm³ are shown in Table 3.

As shown in Table 3, a sharp deterioration was not observed in discharge capacity, and efficiency even when the electrode density was raised to 1.7 g/cm³ or higher, that is, Table 3 indicates that continuous voids sufficient to allow the electrolyte to permeate into an electrode were provided throughout the electrode.

TABLE 3

| electrode density g/cm³ | charge capacity mAh/g | discharge capacity mAh/g | discharge capacity mAh/cm³ | efficiency % |
| --- | --- | --- | --- | --- |
| 1.60 | 378.3 | 355.1 | 545.2 | 93.9 |
| 1.70 | 381.6 | 355.7 | 577.9 | 93.2 |
| 1.80 | 381.0 | 351.0 | 607.5 | 92.1 |

INDUSTRIAL APPLICABILITY

A negative electrode active material having an excellent permeability, even if the electrode density is at 1.7 g/cm² or higher, can be obtained by mixing the three kinds of graphite powders (the negative electrode active material) A, B and C, having different hardnesses and shapes from one another, so that it is possible to produce a negative electrode for a lithium ion rechargeable battery, having less capacity loss, due to charge and discharge, and excellent cycle performance.

The invention claimed is:

1. A negative electrode active material for a lithium ion rechargeable battery, comprising:
   three kinds of graphite powder A, B and C, having different hardnesses and shapes from each other, in a mixing ratio by weight of 30-60% graphite powder A, 20-50% graphite powder B and 10-30% graphite powder C, based on the total weight of graphite powder A+graphite powder B+graphite powder C=100%,
   wherein graphite powder A is obtained by pulverizing an artificial graphite block composed of coke and binder pitch, a relationship between press pressure P, in kN, and electrode density D, in g/cm³, is D=0.04 to 0.06 P, in a press pressure range of 5 to 20 kN, an average particle diameter D50 in a range of 10 to 20 microns and a D90/D10 ratio in a range of 5 to 7,
   graphite powder B has a D90/D10 ratio in a range of 2 to 4, is obtained by coating and impregnating spherical natural graphite with pitch, then baking and graphitizing, a relationship between press pressure P, in kN, and electrode density D, in g/cm3, is D=0.04 to 0.06 P, in a press pressure range of 5 to 20 kN and an average particle diameter D50 in a range of 10 to 20 microns, and
   graphite powder C is obtained by coating and impregnating spherical natural graphite with pitch, subsequently baking at a temperature of from 900 to 1300° C. without graphitizing, a relationship between press pressure P, in kN, and electrode density D, in g/cm3 is D=0.01 to 0.03 P, in a press pressure range of 5 to 20 kN and an average particle diameter D50 in a range of 10 to 20 microns.

2. A negative electrode active material for a lithium ion rechargeable battery, comprising: three kinds of graphite powders A, B and C, having different hardnesses and shapes from each other, wherein a mixing ratio by weight is A=30 to 60%, B=20 to 50%, and C=10 to 30%, A+B+C=100%, the graphite powder A being obtained by pulverizing an artificial graphite block composed of coke and binder pitch, having a tap density in a range of 0.4 to 1.0, the graphite powder B being produced by coating and impregnating spherical natural graphite obtained by spheroidizing of vein and flake natural graphite with pitch, subsequently baking and graphitizing, having a tap density in a range of 0.8 to 1.4 g/cm3, and the graphite powder C is produced by coating and impregnating spherical natural graphite obtained by spheroidizing of vein and flake natural graphite with pitch and subsequently baking without graphitizing, having a tap density in the range of 0.8 to 1.4 g/cm3.

3. A negative electrode for a lithium ion rechargeable battery, comprising the negative electrode active material according to claim 1, wherein the negative electrode active material mixed with a binder is coated onto a metal collector, dried and pressed, thereby rendering an electrode density not lower than 1.7 g/cm³.

4. A negative electrode for a lithium ion rechargeable battery, comprising the negative electrode active material according to claim 2, wherein the negative electrode active material mixed with a binder is coated onto a metal collector, dried and pressed, thereby rendering an electrode density not lower than 1.7 g/cm³.

* * * * *